(12) United States Patent
Manepalli et al.

(10) Patent No.: US 11,032,272 B2
(45) Date of Patent: Jun. 8, 2021

(54) MOBILE NUMBER VERIFICATION FOR MOBILE NETWORK-BASED AUTHENTICATION

(71) Applicant: ZUMIGO, INC., San Jose, CA (US)

(72) Inventors: Harish Manepalli, San Jose, CA (US); Chirag C. Bakshi, San Jose, CA (US)

(73) Assignee: ZUMIGO, INC., San Jose, CA (US)

( * ) Notice: Subject to any disclaimer, the term of this patent is extended or adjusted under 35 U.S.C. 154(b) by 109 days.

(21) Appl. No.: 16/102,624

(22) Filed: Aug. 13, 2018

(65) Prior Publication Data

US 2019/0052629 A1 Feb. 14, 2019

Related U.S. Application Data

(60) Provisional application No. 62/545,299, filed on Aug. 14, 2017.

(51) Int. Cl.
| | |
|---|---|
| *H04L 29/06* | (2006.01) |
| *H04W 12/08* | (2021.01) |
| *H04W 12/06* | (2021.01) |
| *H04W 84/12* | (2009.01) |

(52) U.S. Cl.
CPC ...... *H04L 63/0853* (2013.01); *H04L 63/0876* (2013.01); *H04L 63/10* (2013.01); *H04L 63/102* (2013.01); *H04W 12/06* (2013.01); *H04W 12/08* (2013.01); *H04L 2463/082* (2013.01); *H04W 84/12* (2013.01)

(58) Field of Classification Search
CPC ... H04L 63/0853; H04L 63/102; H04L 63/10; H04L 63/0876; H04L 2463/082; H04W 12/06; H04W 12/08; H04W 84/12
See application file for complete search history.

(56) References Cited

U.S. PATENT DOCUMENTS

| | | | | |
|---|---|---|---|---|
| 6,567,656 B1 * | 5/2003 | Varinot | ............. | H04M 15/8083 455/405 |
| 10,560,845 B1 * | 2/2020 | Manepalli | ............. | H04W 12/06 |
| 2002/0099856 A1 * | 7/2002 | Shitama | ............ | H04L 29/12783 709/249 |

(Continued)

OTHER PUBLICATIONS

International Search Report and Written Opinion dated Nov. 1, 2018 in corresponding International Patent Application No. PCT/US2018/046568, 10 pages.

*Primary Examiner* — Farid Homayounmehr
*Assistant Examiner* — Sanchit K Sarker
(74) *Attorney, Agent, or Firm* — Kim & Stewart LLP (57) ABSTRACT

A mobile number of a mobile device can be employed as an authorization factor when the mobile device is connected to a WLAN. When a user attempts to interact with a restricted access server via the mobile device, verification functions loaded on the mobile device determine whether the mobile device is connected to a WLAN. If so, the verification functions cause the mobile device to open a port on the cellular network interface of the mobile device and transmit data packets to a mobile device identification server via a cellular network. The mobile device identification server can then determine the mobile number of the mobile device based on the cellular network IP address of the mobile device, and transmit the mobile number to the restricted access server as an authentication factor.

18 Claims, 5 Drawing Sheets

(56) References Cited

U.S. PATENT DOCUMENTS

| | | |
|---|---|---|
| 2006/0105810 A1* | 5/2006 | Gnuschke ............ H04M 7/0069 |
| | | 455/558 |
| 2007/0162759 A1 | 7/2007 | Buskey et al. |
| 2007/0220598 A1* | 9/2007 | Salowey ............... H04L 63/062 |
| | | 726/10 |
| 2008/0098464 A1* | 4/2008 | Mizrah ................... G06F 21/36 |
| | | 726/5 |
| 2011/0177812 A1* | 7/2011 | Tanabe .................. H04W 60/04 |
| | | 455/435.1 |
| 2011/0231914 A1* | 9/2011 | Hung ...................... G06F 21/30 |
| | | 726/7 |
| 2012/0054839 A1 | 3/2012 | Friedlander et al. |
| 2016/0014603 A1* | 1/2016 | Woodward ............ H04M 1/677 |
| | | 455/411 |
| 2016/0100331 A1* | 4/2016 | Ahmavaara ....... H04W 72/0406 |
| | | 370/236 |
| 2017/0163635 A1 | 6/2017 | Hirata |
| 2017/0265076 A1* | 9/2017 | Richards ............. H04W 12/128 |
| 2018/0295514 A1 | 10/2018 | Brown et al. |
| 2019/0052629 A1* | 2/2019 | Manepalli ........... H04L 63/0876 |
| 2019/0139024 A1* | 5/2019 | Bakshi .................. H04W 12/06 |

\* cited by examiner

MOBILE NUMBER VERIFICATION FOR MOBILE NETWORK-BASED AUTHENTICATION

BACKGROUND OF THE INVENTION

This application claims benefit of U.S. Provisional Patent Application Ser. No. 62/545,299, filed Aug. 14, 2017, which is herein incorporated by reference in its entirety.

BACKGROUND OF THE INVENTION

Field of the Invention

Embodiments of the present invention generally relate to wireless tele-communication systems and, more specifically, to systems and methods for mobile number verification for mobile network-based authentication.

Description of the Related Art

It has become common practice for multi-factor authentication to be required for login to an account or website associated with sensitive information. For example, when logging in to a bank account via an application on a smartphone, a user may be required to confirm his or her identity via two-factor authentication by entering a user password followed by a single-use passcode that is sent via text message to a mobile phone linked to the bank account. Advantageously, no additional token or device is needed, since users typically have their mobile devices available at all times. Thus, authentication of the user is contingent on a knowledge factor and a possession factor. However, two-factor authentication using text messaging can be problematic, since text messaging adds cost to each transaction, is not always reliably received by a targeted mobile device in a timely manner, and not all mobile device users have text messaging plans.

To retain the user's mobile device as a possession factor while avoiding the issues of text-messaging, technologies have been developed that determine a mobile number of a mobile device when a user interacts with an application or website via the mobile device. Specifically, mobile network carriers currently employ a variety of methods to identify a subscriber's mobile number when data traffic from the mobile device travels on the data network of the mobile network carrier. Once identified, the mobile number can be used to authenticate the subscriber and secure an online transaction performed by the subscriber. However, this mobile number identification is only possible when the data traffic from the mobile device travels on the carrier cellular data network. Consequently, the subscriber's mobile number cannot be employed as an authentication factor when the subscriber's mobile device is connected to a WiFi network or other wireless local area network.

SUMMARY OF THE INVENTION

According to one or more embodiments, a mobile device, such as a smartphone, is determined to be connected to a wireless local area network (WLAN) network for data transfer, and specific data traffic is directed from the mobile device through a cellular communication system to which the mobile device is connected, rather than through the WLAN. The mobile number of the mobile device is then determined based on the specific data traffic that was directed through the cellular communication system. Consequently, when a user performs an activity that requires authentication based on the mobile number of the mobile device, such as an online access, the requisite mobile number can be determined, even when the activity is performed with the mobile device via a WLAN. As a result, the mobile number for the mobile device can be employed for authentication associated with the activity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
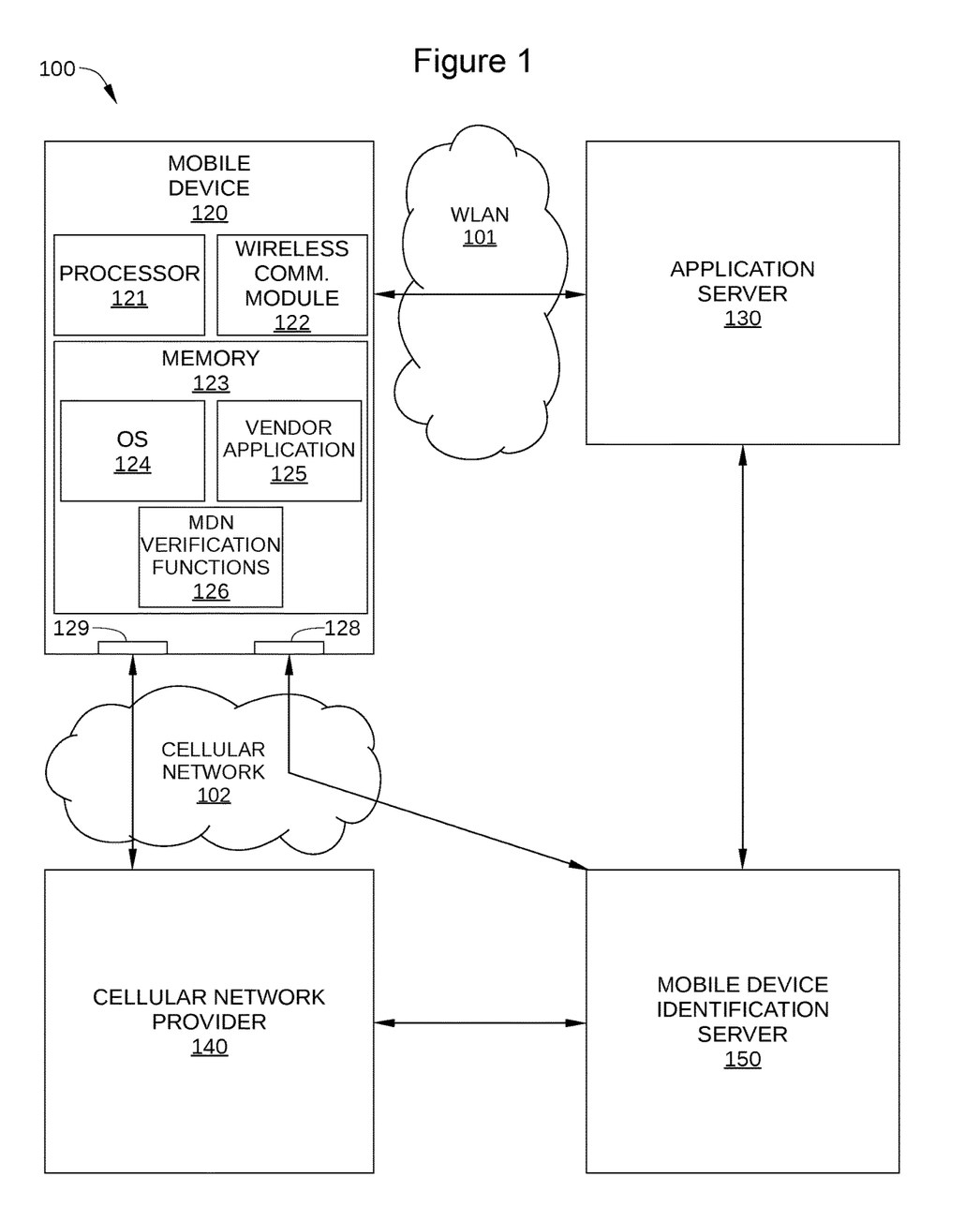
FIG. 1 is a block diagram of a wireless communication system, according to one or more embodiments of the present invention.

FIG. 1 is a block diagram of a wireless communication system 100, according to one or more embodiments of the present invention. As described below, wireless communication system 100 enables identification of a network identification (ID) number associated with a mobile device and authentication of a user activity that requires the identified network ID of the mobile device. In conjunction with another authentication factor, such as a passcode entered by the user when initiating the user activity, wireless communication system 100 can facilitate two-factor authentication of the user activity. Wireless communication system 100 includes a mobile device 120 (such as a cellular telephone or smartphone), an application server 130, a cellular network provider 140, and a mobile device identification server 150. In addition, wireless communication system 100 includes a wireless local area network (WLAN) 101 and a cellular network 102.

WLAN 101 enables compatible devices to connect to the Internet via a wireless access point, or "hotspot." For example, in some embodiments, WLAN 101 is a WiFi network that includes one or more devices based on the Institute of Electrical and Electronics Engineers (IEEE) 802.11 standard. Thus, any suitably configured wireless communication device that can connect to WLAN 101, such as a smartphone with WiFi capability, can perform data transfer to and from the Internet. Furthermore, while mobile device 120 and application server 130 are shown in FIG. 1 to be communicatively coupled via no other communication network than WLAN 101, in other embodiments, one or more additional communication networks may also be employed to communicatively couple mobile device 120 and application server 130, such as the Internet, among others.

Cellular network 102 enables two-way wireless communication with mobile devices, such as mobile device 120. For example, in some embodiments, cellular network 102 includes one or more base stations (not shown) that are in two-way wireless communication with mobile devices, and with a landline system (not shown), such as the public switched telephone network (PSTN) or any other wired network capable of voice/data connections. When an active call associated with mobile device 120 is underway in cellular network 102, a suitable base station translates a forward trunk signal in the landline system to a properly formatted radio signal, which is transmitted by an antenna to mobile device 120 over an air interface. mobile device 120 performs complementary operations to enable the two-way voice or data traffic over the air interface. The term "voice traffic," as used herein, includes the communication of conventional audio signals that are carried by the landline system and cellular network 102. The term "data traffic," as used herein, includes data, such as facsimile or computer data, that are carried by the landline system and cellular network 102.

Mobile device 120 can be a cellular telephone (also referred to as a wireless subscriber terminal), a smart phone, a personal digital assistant (PDA), a tablet computer, or any other mobile computing device configured to wirelessly access WLAN 101 and cellular network 102, and to practice one or more embodiments of the present invention. To that end, in some embodiments, mobile device 120 includes a processor 121, a wireless communication module 122, and a memory 123. Processor 121 may be any suitable processing unit implemented as a central processing unit (CPU), an application-specific integrated circuit (ASIC), a field programmable gate array (FPGA), any other type of processing unit, or a combination of different processing units. Wireless communication module 122 may be any suitable electronics package and or chipset configured to enable wireless communication with WLAN 101 and cellular network 102. Thus, in some embodiments, wireless communication module 122 includes cellular capability and WiFi capability, among others. Alternatively or additionally, in some embodiments, wireless communication module 122 includes Bluetooth capability. Memory 123 can include any suitable volatile and/or nonvolatile memory (e.g., random-access memory (RAM), read-only memory (ROM), flash memory, a magnetic hard drive, etc.), and is configured to store instructions, data, an operating system (OS) 124, a vendor application 125, and/or MDN verification/identification functions 126.

OS 124 supports the functions of processor 121, including scheduling tasks and sending commands to vendor application 125, memory 123, and wireless module 122, managing the power state of mobile device 120, initiating execution of applications on processor 121, managing sockets and TCP connections, and the like. For example, in some embodiments, OS 124 is configured to open a verification port 128 and a second verification port 129, among other operations.

Vendor application 125 is a computer program designed to run on mobile device 120, such as a so-called "mobile application" or "mobile app." Vendor application 125 is loaded on mobile device 120 and facilitates interactions with a particular website, such as application server 130, a particular database, or some other computing device. For example, in some embodiments, vendor application 125 is a banking application, a navigational program, an application that facilitates online purchasing of entertainment media from a specific website, etc. As described herein, vendor application 125, in conjunction with MDN verification/identification functions 126, is also configured to facilitate the identification of a mobile number and an authorization process when a user requests access to application server 130.

MDN verification/identification functions 126 include executable instructions that enable performance of various embodiments of the invention as described herein. Specifically, MDN verification/identification functions 126, when executed by processor 121, enable the determination that mobile device 120 is connected to WLAN 101, the routing of specific data traffic from mobile device 120 via cellular network 102 to mobile device identification server 150 and/or cellular network provider 140, and, based on the specific data traffic so routed, determination/identification of the MDN or other mobile number of mobile device 120. While shown in FIG. 1 as a separate entity from vendor application 125, in practice MDN verification/identification functions 126 can be executed as part of vendor application 125. Thus, in some embodiments, MDN verification/identification functions 126 are implemented as code included in vendor application 125, as a separate application running in parallel with vendor application 125 in processor 121, or as independent code running in vendor application 125, such as code from a software development kit (SDK) or other set of software development tools. A more detailed description of MDN verification/identification functions 126 is set forth below in conjunction with FIGS. 2-5.

Application server 130 can be any entity that can be accessed by mobile subscriber terminal 120 via WiFi network 101 and can benefit from identification and/or authorization of a user prior to access by the user. More specifically, application server 130 can be any entity that provides access to a vendor website or to sensitive information. Alternatively or additionally, application server 130 enables important data and/or financial transactions. Application server 130 can be implemented as a website, an application, a server, a database, an application running on an instance of virtual machine, and the like. Thus, in some embodiments, application server 130 is a public or open server, whereas in other embodiments, application server 130 is a restricted access only server. For example, in some embodiments, application server 130 can be a restricted access server, a merchant server, a vendor website, an e-mail server or application that enables interaction with an e-mail server, a banking website, a cloud storage server, and the like. Thus, restricted access server 130 can be any computing device, application, or other entity that can be accessed by mobile device 120 via vendor application 125. As noted above, vendor application 125 is configured to facilitate access to and interactions with application server 130.

As noted above, in some embodiments, application server 130 stores and/or provides access to sensitive information and/or enables important data and/or financial transactions. As such, interactions with application server 130, particularly online interactions, generally require authentication, and frequently require two-factor authentication. For example, in some embodiments, a knowledge factor (for example a user-entered personal identification number or passcode) and a possession factor (for example possession of mobile device 120) are employed by application server 130 to approve user access to application server 130. That is, user access to application server 130 via mobile device 120 is not approved unless a two-factor authentication process is successfully completed in which a knowledge factor and a possession factor are verified. For example, suitable knowledge factors include a user-entered personal identification number (PIN) or passcode/password. A suitable possession factor is possession of mobile device 120, where possession is indicated by electronic confirmation that the mobile number, MDN, or mobile identification number (MIN) of the mobile device 120 performing the current interaction with application server 130 corresponds to a phone number associated with the account being accessed on application server 130.

In some embodiments, some or all of the two-factor authorization process is performed by application server 130. In other embodiments, some or all of the two-factor authorization process is performed by an external authorization entity (not shown). Such an external authorization entity may be, for example, an application that runs on a server or other computing device coupled to the Internet (or other communications network), and is configured to perform authentication of a user based on the knowledge factor and the possession factor.

Cellular network provider 140 represents one or more computing devices or servers included in cellular network 102 that are employed by the provider of cellular network 102 for communicating control, status, and signaling information between nodes in cellular network 102. In some embodiments, cellular network provider 140 is included in a Signaling System 7 (SS7) network. In some embodiments, cellular network provider 140 includes the capability of cellular network 102 to allocate Internet protocol (IP) addresses to mobile devices 120 and to map currently allocated IP addresses to the mobile numbers, MDNs, and/or MINs of mobile devices 120. Henceforth, the mobile number, MDN, and MIN of mobile device 120 are referred to collectively herein as the "network ID" of mobile device 120.

Mobile device identification server 150 facilitates the identification of the network ID of mobile device 120 when vendor application 125 attempts to access or otherwise interact with application server 130. In addition, mobile device identification server 150 facilitates authorization of a user activity that employs the identified network ID as an authentication factor, for example by providing the identified network ID to an appropriate computing device. In some embodiments, mobile device identification server 150 can directly determine the network ID of mobile device 120 based on packets received from mobile device 120 via cellular network 102. In other embodiments, mobile device identification server 150 determines the network ID of mobile device 120 based on information transmitted from cellular network provider 140. In either case, once the network ID of mobile device 120 is determined by mobile device identification server 150, mobile device identification server 150 transmits network ID of mobile device 120 to application server 130, thereby enabling two-factor authorization of a user attempting to access application server 130 via vendor application 125. It is noted that the network ID transmitted to application server 130 by mobile device identification server 150 can include the network ID of mobile device 120 in a plain text, encrypted, or any other suitable format. It is further noted that, when determined by mobile device identification server 150, the network ID of mobile device 120 is electronically verified, and is not merely data entered by the user of mobile device 120.

Mobile device identification server 150 may be an application that runs on a server or other computing device coupled to the Internet or other communications network, and is configured to execute network ID verification operations as described herein. One embodiment of such network ID verification operations is described below in conjunction with FIG. 2.

Figure 2:
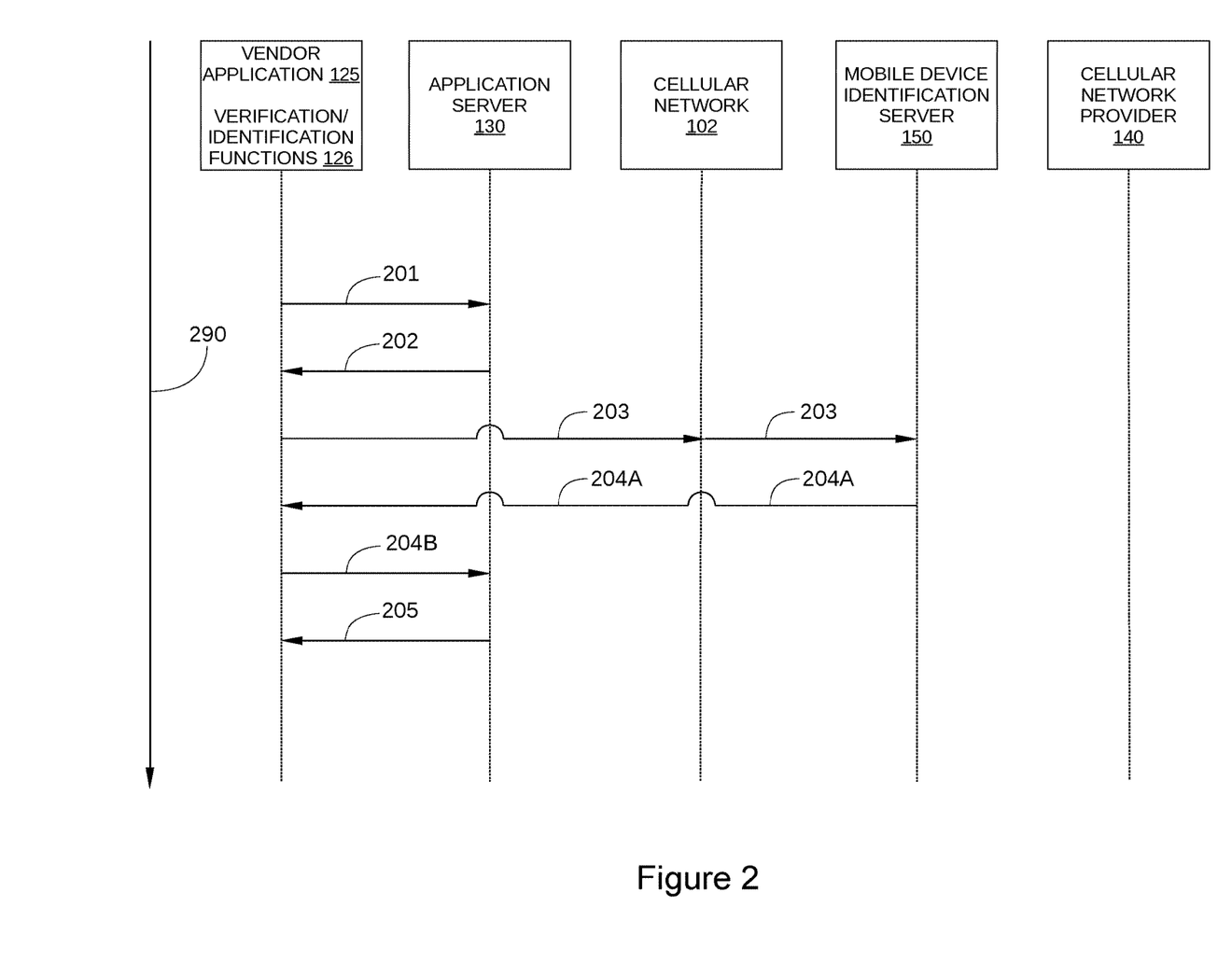
FIG. 2 schematically illustrates the steps performed by the wireless communication system of FIG. 1 as the steps occur sequentially along a time line, according to one or more embodiments of the invention.

FIG. 2 schematically illustrates the steps performed by wireless communication system 100 as the steps occur sequentially along a time line 290, according to one or more embodiments of the invention. As described above, wireless communication system 100 enables electronic verification of the network ID of mobile device 120 when a user attempts to access application server 130 via mobile device 120. Thus, in conjunction with another authentication factor, such as knowledge and entry of a PIN or passcode, wireless communication system 100 enables two-factor authentication of such user activity.

In operation, mobile device 120 connects to WLAN 101 when available, so that data traffic is carried over WLAN 101 rather than cellular network 102. By contrast, voice data are typically transmitted to and from mobile device 120 via cellular network 102. Thus, even when no voice communications are being carried out via cellular network 102, a radio interface layer (RIL) is typically extant in OS 124 that enables voice communications and other interactions with cellular network 102.

When a user attempts to initiate an online transaction or otherwise interact with application server 130, vendor application 125 transmits a login request 201 to application server 130 in order to login or otherwise access application server 130. For example, after a connection is established between mobile device 120 and application server 130 via WLAN 101, a user may select an icon displayed on mobile device 120 to initiate login request 201. The icon may be displayed by, for example, vendor application 125 or by a web browser that is running on processor 121 and is connected to application server 130. Login request 201 is transmitted to application server 130 via WLAN, and therefore is not transmitted via cellular network 102. Thus, the provider of cellular network 102 has no knowledge of the IP address associated with communications between mobile device 120 and application server 130.

Application server 130 then transmits a request for authorization credentials 202 to mobile device 120. For example, in some embodiments, request for authorization credentials 202 includes a request for an electronic verification that the mobile device 120 from which login request 201 was received corresponds to the account being accessed by login request 201. In such embodiments, electronic verification of the network ID of the mobile device 120 from which login request 201 was received is generally needed, so that application server 130, or some other external authorization entity, can confirm that the user requesting access to application server 130 is in possession of the mobile device 120 that is linked to the account being accessed. In embodiments in which two-factor authorization is employed by application server 130, request for authorization credentials 202 also includes a request for an additional authentication factor, such as a user-entered passcode, PIN, or other user-entered value. Typically, such a passcode or PIN can be entered via vendor application 125.

Upon receipt of request for authorization credentials 202, vendor application 125 initiates one or more of MDN verification/identification functions 126 to determine whether mobile device 120 is connected to WLAN 101 and, if so, to transmit data packets 203 to mobile device identification server 150 via cellular network 102. One embodiment of MDN verification/identification functions 126 is described below in conjunction with FIG. 3.

Figure 3:
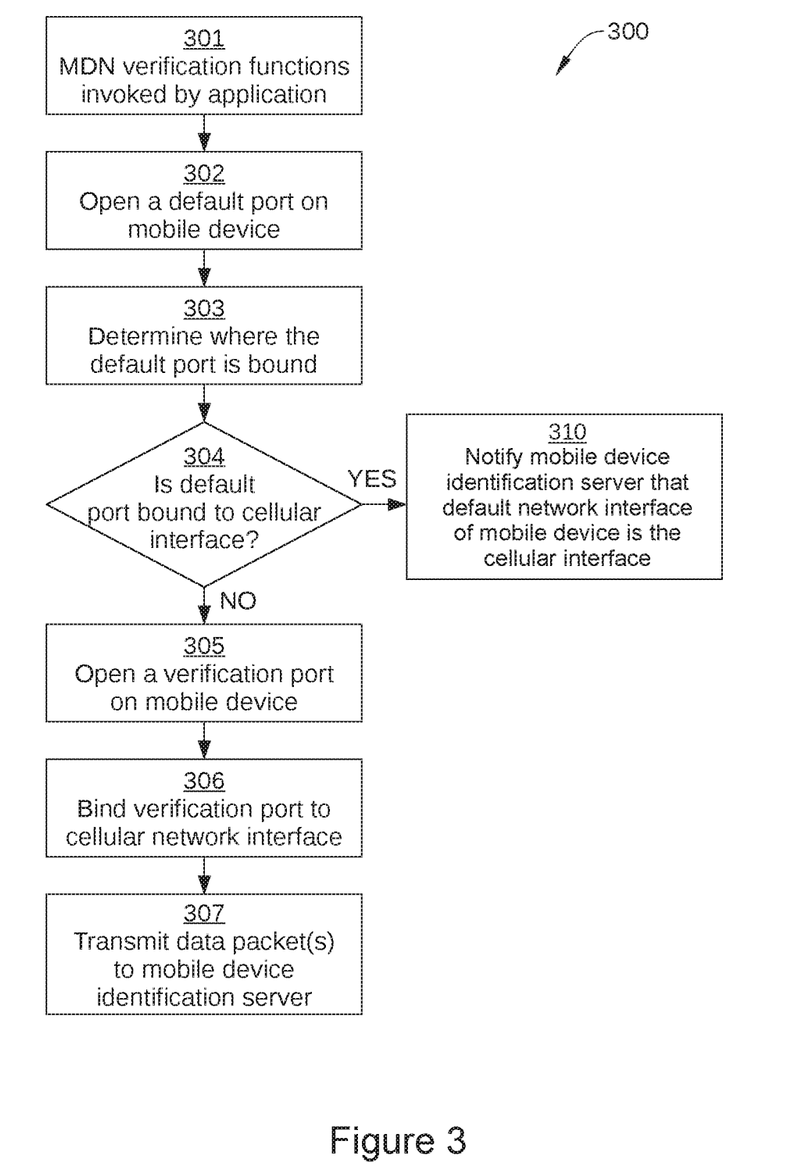
FIG. 3 is a flowchart of method steps for routing data traffic via a cellular network when a mobile device is determined to be connected to a wireless local area network (WLAN), according to one or more embodiments of the invention.

FIG. 3 is a flowchart of method steps for routing data traffic via cellular network 102 when mobile device 120 is determined to be connected to WLAN 101, according to one or more embodiments of the invention. Although the method steps are described in conjunction with the mobile device 120 of FIG. 1, persons skilled in the art will understand that the method steps may be performed with other suitable mobile devices. The control algorithms for the method steps may reside in and/or be performed by MDN verification/identification functions 126, either as a stand-alone application executing on processor 121 or as code included in vendor application 125.

As shown, a method 300 begins at step 301, where MDN verification/identification functions 126 are invoked or otherwise initiated by vendor application 125. For example, in some embodiments, vendor application 125 invokes MDN verification/identification functions 126 when queried for the network ID of mobile device 120 via request for authorization credentials 202.

In step 302, MDN verification/identification functions 126 request that OS 124 open a default port on mobile device 120. In response, a port is opened on the active interface (or RIL) of mobile device 120. Because mobile device 120 is currently connected to WLAN 101, the default port of mobile device 120 is opened on the WLAN network interface, and not on the cellular network interface of mobile device 120.

In step 303, MDN verification/identification functions 126 query OS 124 to determine where the default port is bound. For example, in some embodiments, MDN verification/identification functions 126 query OS 124 for the name of the network interface to which the default port opened in step 302 is bound.

In step 304, MDN verification/identification functions 126 determine whether the default port is bound to the cellular network interface of mobile device 120. If yes, method 300 proceeds to step 310; if no, method 300 proceeds to step 305. For example, in some embodiments, MDN verification/identification functions 126 make such a determination based on the name of the network interface received from OS 124 in step 303.

In step 305, MDN verification/identification functions 126 cause a verification port 128 to be opened on mobile device 120. For example, in some embodiments, MDN verification/identification functions 126 request that OS 124 open a new port on mobile device 120.

In step 306, MDN verification/identification functions 126 cause verification port 128 to be bound to the cellular network interface of mobile device 120. For example, in some embodiments, MDN verification/identification functions 126 request that OS 124 bind verification port 128 to the cellular network interface of mobile device 120.

In step 307, MDN verification/identification functions 126 transmit one or more data packets 203 (shown in FIG. 2) to mobile device identification server 150 via cellular network 102. Data packets 203 include information indicating that application server 130 has requested electronic verification of the network ID of mobile device 120. In addition, data packets 203 include an IP address associated with the cellular network interface of mobile device 120.

In step 310, which is performed in response to the determination that the default port of mobile device 120 is bound to the cellular network interface of mobile device 120, MDN verification/identification functions 126 notify mobile device identification server 150 that the default network connection of mobile device 120 is via cellular network 102. For example, MDN verification/identification functions 126 notify mobile device identification server 150 via one or more data packets 203. Therefore, mobile device identification server 150 can simply query cellular network provider 140 for the network ID of mobile device 120 based on the IP address associated with the point of origin of the notification from MDN verification/identification functions 126. In addition, data packets 203 include information indicating that application server 130 has requested electronic verification of the network ID of mobile device 120.

Method 300 describes an application-side detection of whether mobile device 120 is connected to WLAN 101. Alternatively, in some embodiments, server-side detection can be performed in lieu of method 300. In such a server-side detection scheme, mobile device identification server 150 determines whether mobile device 120 is connected to WLAN 101 based on the IP address associated with one or more data packets 203 transmitted by MDN verification/identification functions 126 to mobile device identification server 150. In either case, data packets 203 are transmitted to mobile device identification server 150 from MDN verification/identification functions 126.

Returning to FIG. 2, upon receipt of request for authorization credentials 202, vendor application 125 initiates one or more of MDN verification/identification functions 126, which perform method 300 as described above. As a result, vendor application 125 or MDN verification/identification functions 126 send one or more data packets 203 to mobile device identification server 150. As noted above, data packets 203 are sent to mobile device identification server 150 via cellular network 102, even though the active interface of mobile device 120 is the WLAN network interface. Elements of cellular network 102 are responsible for allocating the IP address associated with communications from mobile device 120 via cellular network 102, such as data packets 203. Consequently, in the embodiment illustrated in FIG. 2, elements of cellular network 102 can insert a header in data packets 203 that includes network ID information for mobile device 120.

Upon receipt of data packets 203, mobile device identification server 150 determines the network ID of mobile device 120, based on the network ID information for mobile device 120 included in the header of data packets 203.

Mobile device identification server 150 then transmits network ID information 204A for mobile device 120 to MDN verification/identification functions 126. As noted above, the network ID information 204A transmitted to MDN verification/identification functions 126 by mobile device identification server 150 includes the network ID of mobile device 120 in a plain text, encrypted, or any other suitable format. Network ID information 204A may be transmitted by any suitable communication network, and not necessarily by cellular network 102.

Upon receipt of network ID information 204A from mobile device identification server 150, MDN verification/identification functions 126 redirect network ID information 204A to application server 130 as network ID information 204B.

Upon receipt of network ID information 204B from MDN verification/identification functions 126, application server 130 can determine whether the network ID of the mobile device 120 from which login request 201 was received corresponds to the network ID or mobile number linked to the account being accessed by login request 201. When these network IDs match, application server 130 transmits an authorization notification 205 to vendor application 125, and the user of mobile device 120 can interact with application server 130 normally.

In the embodiment illustrated in FIG. 2, mobile device identification server 150 directly determines the network ID of mobile device 120 based on network ID information included in the header of data packets 203. In other embodiments, the provider of cellular network 102 does not include such header information, and mobile device identification server 150 receives the network ID of mobile device 120 from cellular network provider 140, either directly or indirectly. One such embodiment is illustrated in FIG. 4.

Figure 4:
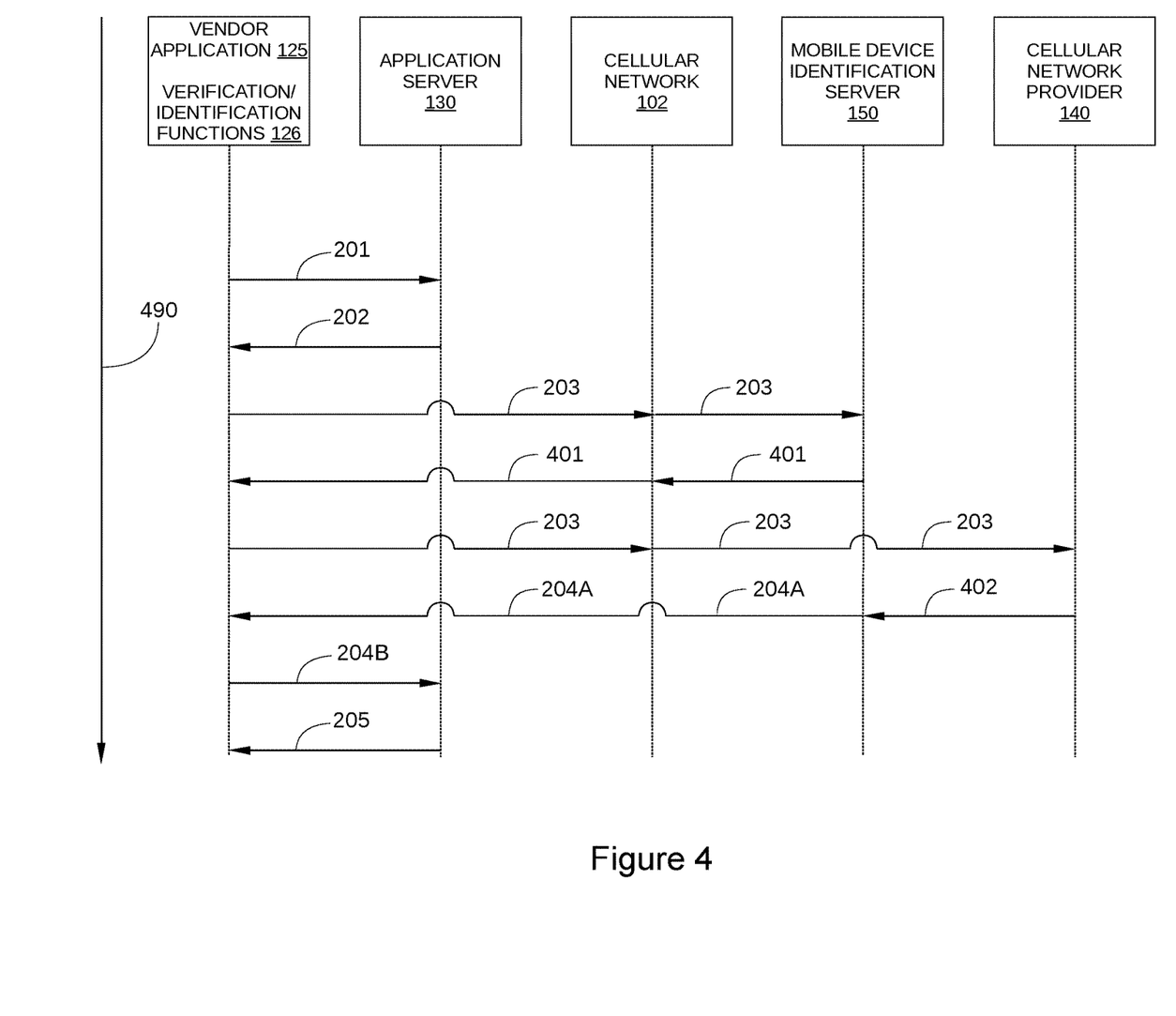
FIG. 4 is a block diagram illustrating the steps performed by the wireless communication system of FIG. 1 as the steps occur sequentially along a time line, according to one or more embodiments of the invention.

FIG. 4 schematically illustrates the steps performed by wireless communication system 100 as the steps occur sequentially along a time line 490, according to one or more embodiments of the invention. When a user attempts to initiate an online transaction or otherwise interact with application server 130 via WLAN 101, vendor application 125 transmits login request 201 to application server 130 in order to login or otherwise access application server 130. Application server 130 then transmits request for authorization credentials 202 to mobile device 120. Upon receipt of request for authorization credentials 202, vendor application 125 initiates one or more of MDN verification/identification functions 126 to determine whether mobile device 120 is connected to WLAN 101 and, if so, to transmit data packets 203 to mobile device identification server 150 via cellular network 102, as described above in conjunction with FIG. 3.

Upon receipt of data packets 203 from mobile device 120, mobile device identification server 150 redirects data packets 203 to cellular network provider 140. That is, mobile device identification server 150 transmits a redirect notification 401 to MDN verification/identification functions 126 that includes a uniform resource locator (URL) associated with cellular network provider 140.

Upon receipt of redirect notification 401, MDN verification/identification functions 126 transmit data packets 203 to cellular network provider 140, based on redirect information included in redirect notification 401. MDN verification/identification functions 126 transmit data packets 203 to cellular network provider 140 via cellular network 102. As a result, cellular network provider 140 can determine the network ID of mobile device 120 based on the IP address associated with the source of data packets 203. For example, in some embodiments, upon receipt of redirect notification 401, MDN verification/identification functions 126 cause second verification port 129 to be opened on mobile device 120, and cause second verification port 129 to be bound to the cellular network interface of mobile device 120. In some embodiments, MDN verification/identification functions 126 request that OS 124 open a new port on mobile device 120 and bind second verification port 129 to the cellular network interface of mobile device 120. MDN verification/identification functions 126 then transmit data packets 203 to cellular network provider 140 via a socket that includes second verification port 129.

Upon receipt of data packets 203 from mobile device 120, cellular network provider 140 determines the network ID of mobile device 120 based on the IP address associated with the source of data packets 203, and transmits data packets 402 to mobile device identification server 150. Data packets 402 include as a payload the network ID information for mobile device 120 as determined by cellular network provider 140. Mobile device identification server 150 then transmits network ID information 204A for mobile device 120 to MDN verification/identification functions 126. Upon receipt of network ID information 204A from mobile device identification server 150, MDN verification/identification functions 126 redirect network ID information 204A to application server 130 as network ID information 204B. Upon receipt of network ID information 204B from MDN verification/identification functions 126, application server 130 can determine whether the network ID of the mobile device 120 from which login request 201 was received corresponds to the network ID linked to the account being accessed by login request 201. When these network IDs match, application server 130 transmits an authorization notification 205 to vendor application 125, and the user of mobile device 120 can interact with application server 130 normally.

In alternative embodiments, cellular network provider 140 does not transmit data packets 402 that include the network ID information for mobile device 120 to mobile device identification server 150, as shown in FIG. 4. Instead, in such embodiments, when cellular network provider 140 determines the network ID of mobile device 120 based on the IP address associated with the source of data packets 203, cellular network provider 140 transmits a token to MDN verification/identification functions 126. MDN verification/identification functions 126 then pass the token to mobile device identification server 150. Once mobile device identification server 150 possesses the token, mobile device identification server 150 can query cellular network provider 140 for the network ID associated with that token. Once received from cellular network provider 140, mobile device identification server 150 transmits the network ID of mobile device 120 to application server 130 as described above.

Figure 5:
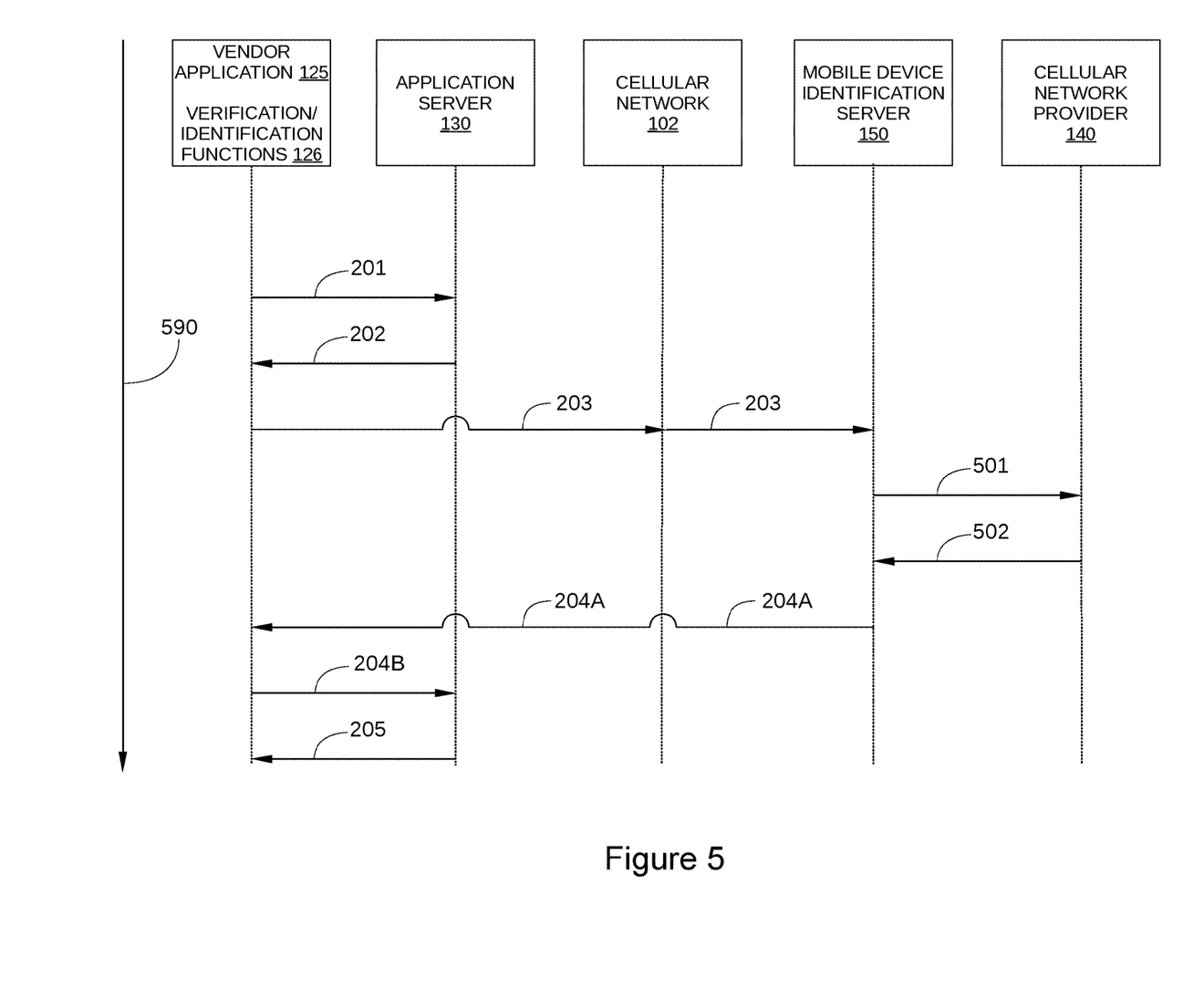
FIG. 5 is a block diagram illustrating the steps performed by the wireless communication system of FIG. 1 as the steps occur sequentially along a time line, according to one or more different embodiments of the invention.

In some embodiments, mobile device identification server 150 determines the network ID of mobile device 120 based on an Internet Protocol version 6 (IPv6) address included in data packets received from mobile device 120. One such embodiment is illustrated in FIG. 5. FIG. 5 schematically illustrates the steps performed by wireless communication system 100 as the steps occur sequentially along a time line 590, according to one or more embodiments of the invention. The steps in FIG. 5 are substantially similar to the steps in FIG. 2 up to and including when mobile device identification server 150 receives data packets 203 from MDN verification/identification functions 126.

However, in the embodiment described in FIG. 5, data packets 203 include an IPv6 address. The addressable space associated with IPv6 is sized to accommodate a one-to-one mapping of IP addresses and network IDs. In addition, IPv6 addresses can be organized to implicitly include metadata in the form of predefined address ranges that are associated with a particular entity, such as a cellular network provider. Thus, upon receipt of data packets 203 from mobile device 120, mobile device identification server 150 can determine which cellular network provider has allocated the IPv6 address to mobile device 120 based on the IPv6 address included in data packets 203. Therefore, after identifying the particular cellular network provider that allocated the IPv6 address to the source of data packets 203 (i.e., mobile device 120), mobile device identification server 150 transmits a network ID query 501 to that cellular network provider. In FIG. 5, that particular cellular network provider is represented by cellular network provider 140. Upon receiving network ID query 501, cellular network provider 140 determines the network ID of mobile device 120, based on the one-to-one mapping of IP addresses that are allocated to network IDs by the cellular network provider, then transmits data packets 502 to mobile device identification server 150. Data packets 502 include as a payload the network ID information for mobile device 120 as determined by cellular network provider 140. Mobile device identification server 150 then transmits network ID information 204A for mobile device 120 to MDN verification/identification functions 126. Upon receipt of network ID information 204A from mobile device identification server 150, MDN verification/identification functions 126 redirect network ID information 204A to application server 130 as network ID information 204B. Upon receipt of network ID information 204B from MDN verification/identification functions 126, application server 130 can determine whether the network ID of the mobile device 120 from which login request 201 was received corresponds to the network ID linked to the account being accessed by login request 201. When these network IDs match, application server 130 transmits an authorization notification 205 to vendor application 125, and the user of mobile device 120 can interact with application server 130 normally.

In sum, embodiments described herein enable the network ID of a mobile device to be employed as an authorization factor, even when the mobile device is connected to a WLAN and the network ID cannot be determined from the WLAN-based IP address of the mobile device. Specifically, when a user attempts to interact with a restricted access server via the mobile device, MDN verification functions loaded on the mobile device determine whether the mobile device is connected to a WLAN. If so, the MDN verification functions cause the mobile device to open a port on the cellular network interface of the mobile device and transmit data packets to an MDN verification server via a cellular network. The MDN verification server can then determine the network ID of the mobile device based on the cellular network IP address of the mobile device, and transmit the network ID to the restricted access server as an authentication factor. In this way, a user activity that is authenticated based on a subscriber's network ID can be performed with the mobile device via a WLAN. Thus, the embodiments provide a technical advancement that leads to enhancing security and reducing fraud.

While the foregoing is directed to embodiments of the present invention, other and further embodiments of the invention may be devised without departing from the basic scope thereof, and the scope thereof is determined by the claims that follow.

We claim:

1. A computer-implemented method of authorizing a user's mobile device to log into a user account on an application server based on a network identification (ID) for the mobile device when the mobile device is connected to a wireless local area network (WLAN) that is separate from a cellular network, the method comprising:
   receiving a request for authorization credentials from the application server via the WLAN;
   in response to receiving the request, causing a default port to be opened on the mobile device and determining that the default port opened on the mobile device is bound to the WLAN;
   in response to the determining that the default port is bound to the WLAN, directing the mobile device to transmit one or more data packets to a mobile device identification server via the cellular network and not via the WLAN, wherein the network ID for the mobile device is determined using information included in the one or more data packets;
   receiving the network ID for the mobile device from the mobile device identification server;
   transmitting the network ID for the mobile device received from the mobile device identification server to the application server; and
   receiving an authorization to log into the user account from the application server via the WLAN,
   wherein the authorization is generated by the application server based on the network ID for the mobile device.

2. The computer-implemented method of claim 1, wherein the mobile device identification server is separate from the application server.

3. The computer-implemented method of claim 1, wherein the network ID for the mobile device is determined by the mobile device identification server from the information included in the one or more data packets when the default port opened on the mobile device is identified as not being bound to the cellular network.

4. The computer-implemented method of claim 3, wherein the information included in the one or more data packets is an Internet Protocol (IP) address.

5. The computer-implemented method of claim 3, wherein the mobile device identification server uses the information included in the one or more data packets to query a provider of the cellular network connection for the network ID for the mobile device, and the provider of the cellular network transmits the network ID for the mobile device to the mobile device identification server.

6. The computer-implemented method of claim 3, wherein the information included in the one or more data packets is a header, and wherein the header is inserted in the one or more data packets by a provider of the cellular network.

7. The computer-implemented method of claim 1, further comprising:
   receiving a token from a provider of the cellular network via the cellular network; and
   transmitting the token to the mobile device identification server, wherein the mobile device identification server queries the provider of the cellular network for a network ID associated with the token, and the network ID associated with the token is the network ID for the mobile device.

8. The computer-implemented method of claim 1, wherein determining that the default port is bound to the WLAN comprises querying an operating system (OS) of the mobile device for a name of a network interface to which the default port is bound.

9. The computer-implemented method of claim 1, wherein directing the mobile device to transmit the one or more data packets to the mobile device identification server via the cellular network requires first completing the following steps of:
   causing a verification port to be opened on the mobile device; and
   causing the verification port to be bound to a network interface of the mobile device that is associated with the cellular network.

10. The computer-implemented method of claim 1, wherein the request for authorization credentials for access to received from the application server includes a request for entry of a user-entered value.

11. The computer-implemented method of claim 1, wherein the application server is a restricted access computing device.

12. A computer-implemented method of authorizing a user's mobile device to log into a user account on an application server based on a network identification (ID) for the mobile device when the mobile device is connected to a wireless local area network (WLAN) that is separate from a cellular network, the method comprising:
- receiving at a mobile device identification server, one or more data packets from the mobile device via the cellular network;
- determining by the mobile device identification server, the network ID for the mobile device using information included in the one or more data packets; and
- transmitting by the mobile device identification server, the network ID for the mobile device to an application installed on the mobile device,
- wherein the application installed on the mobile device causes a default port to be opened on the mobile device and determines that the default port opened on the mobile device is bound to the WLAN and, in response to the determining that the default port is bound to the WLAN, directs the mobile device to transmit the one or more data packets to the mobile device identification server via the cellular network and not via the WLAN, and
- wherein the application installed on the mobile device transmits the received network ID for the mobile device to the application server via the WLAN, and based on the network ID for the mobile device, the application server generates an authorization for the mobile device to log into the user account and transmits the authorization to the mobile device via the WLAN.

13. The computer-implemented method of claim 12, wherein the information included in the one or more data packets is an Internet Protocol (IP) address.

14. The computer-implemented method of claim 13, further comprising:
- extracting the IP address from the one or more data packets;
- determining a provider of the cellular network based on the IP address; and
- querying the provider of the cellular network for a network ID associated with the IP address, wherein the network ID associated with the IP address is the network ID for the mobile device.

15. The computer-implemented method of claim 12, wherein determining the network ID for the mobile device comprises extracting the network ID from a header included in the one or more data packets, wherein the header is inserted in the one or more data packets by a provider of the cellular network.

16. A computer-implemented method of authorizing a user's mobile device to log into a user account on an application server based on a network identification (ID) for the mobile device when the mobile device is connected to a wireless local area network (WLAN) that is separate from a cellular network, the method comprising:
- receiving at a mobile device identification server, one or more data packets from the mobile device via the cellular network;
- redirecting by the mobile device identification server, the one or more data packets to a provider of the cellular network;
- receiving at the mobile device identification server, the network ID for the mobile device from the provider of the cellular network; and
- transmitting by the mobile device identification server, to the mobile device, the network ID for the mobile device via the cellular network,
- wherein an application installed on the mobile device causes a default port to be opened on the mobile device and determines that the default port opened on the mobile device is bound to the WLAN and, in response to the determining that the default port is bound to the WLAN, directs the mobile device to transmit the one or more data packets to the mobile device identification server via the cellular network and not via the WLAN, and
- wherein the application installed on the mobile device transmits the received network ID for the mobile device to the application server via the WLAN, and based on the network ID for the mobile device, the application server generates an authorization for the mobile device to log into the user account and transmits the authorization to the mobile device via the WLAN.

17. The computer-implemented method of claim 16, wherein the provider of the cellular network transmits the network ID for the mobile device to the mobile device identification server in response to receiving the one or more redirected data packets.

18. The computer-implemented method of claim 17, wherein the provider of the cellular network determines the network ID based on information included in the one or more redirected data packets.

\* \* \* \* \*

UNITED STATES PATENT AND TRADEMARK OFFICE
CERTIFICATE OF CORRECTION

| | |
|---|---|
| PATENT NO. | : 11,032,272 B2 |
| APPLICATION NO. | : 16/102624 |
| DATED | : June 8, 2021 |
| INVENTOR(S) | : Harish Manepalli et al. |

It is certified that error appears in the above-identified patent and that said Letters Patent is hereby corrected as shown below:

In the Claims

Column 12, Claim 5, Line 29, delete "connection".

Column 12, Claim 10, Lines 65-66, delete "for access to".

Column 12, Claim 10, Line 67, delete "entry of".

Signed and Sealed this
Twenty-first Day of June, 2022

Katherine Kelly Vidal
*Director of the United States Patent and Trademark Office*